United States Patent
Aupperle et al.

(10) Patent No.: US 8,397,293 B2
(45) Date of Patent: Mar. 12, 2013

(54) SUSPICIOUS NODE DETECTION AND RECOVERY IN MAPREDUCE COMPUTING

(75) Inventors: Bryan E. Aupperle, Durham, NC (US); David L. Kaminsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/651,100

(22) Filed: Dec. 31, 2009

(65) Prior Publication Data

US 2011/0162069 A1    Jun. 30, 2011

(51) Int. Cl.
*H04L 29/06* (2006.01)
(52) U.S. Cl. ......................................................... 726/22
(58) Field of Classification Search ...................... 726/22
See application file for complete search history.

(56) References Cited

U.S. PATENT DOCUMENTS

| | | | |
|---|---|---|---|
| 6,167,521 A | 12/2000 | Smith et al. | |
| 6,484,203 B1 * | 11/2002 | Porras et al. | 709/224 |
| 7,630,381 B1 * | 12/2009 | Roskind et al. | 370/395.42 |
| 2008/0196103 A1 * | 8/2008 | Lin et al. | 726/24 |

* cited by examiner

*Primary Examiner* — Jason Gee
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to distributed computing for large data sets on clusters of computers and provide a novel and non-obvious method, system and computer program product for detecting and correcting malicious nodes in a cloud computing environment (e.g., MapReduce computing). In one embodiment of the invention, a computer-implemented method for detecting and correcting malicious nodes in a cloud computing environment can include selecting a task to dispatch to a first worker node, setting a suspicion index threshold for the selected task, determining a suspicion index for the selected task, comparing the suspicion index to the suspicion index threshold and receiving a result from a first worker node. The method further can include applying a recovery action when the suspicion index exceeds the selected suspicion index threshold.

16 Claims, 2 Drawing Sheets

SUSPICIOUS NODE DETECTION AND RECOVERY IN MAPREDUCE COMPUTING

BACKGROUND OF THE INVENTION

1. Field of the Invention

The present invention relates to distributed computing for large data sets on clusters of computers and more particularly to suspicious node detection and recovery in MapReduce computing.

2. Description of the Related Art

Application server clusters have become common in the field of high-availability and high-performance computing. Application cluster-based systems exhibit three important and fundamental characteristics or properties: reliability, availability and serviceability. Each of these features is of paramount importance when designing a robust clustered system. Generally, a clustered system consists of multiple application server instances grouped together in a server farm of one or more server computing nodes that are connected over high-speed network communicative linkages. Each application server process in the application cluster can enjoy access to memory, possibly disk space and the facilities of a host operating system.

Among the many challenges faced by those who manage the capacity and performance of a clustered system is the allocation of network resources for consumption by a particular application or workload. Network resources in a cluster can be managed through agents known as workload managers. The workload managers can optimally assign different network resources within endpoint containers to handle selected workloads in an application. In many cases, workload managers can adjust the assignment of network resources based upon performance metrics measured through systems management components in the clustered system.

MapReduce is a parallel programming technique frequently used in Cloud computing environments. In other words, MapReduce is a framework for processing huge datasets on certain kinds of distributable problems using a large number of computers (nodes), collectively referred to as a cloud or cluster. Computational processing can occur on data stored either in a filesystem (unstructured) or within a database (structured). MapReduce has two main components a "Map" step and a "Reduce" step.

"Map" step: The master node takes the input, chops it up into smaller sub-problems, and distributes those to worker nodes. (A worker node may do this again in turn, leading to a multi-level tree structure.) The worker node processes that smaller problem, and passes the answer back to its master node.

"Reduce" step: The master node then takes the answers to all the sub-problems and combines them in a way to get the output—the answer to the problem it was originally trying to solve.

One advantage of MapReduce is that it allows for distributed processing of the map and reduction operations. Provided each mapping operation is independent of the other, all maps can be performed in parallel—though in practice it is limited by the data source and/or the number of CPUs near that data. Similarly, a set of 'reducers' can perform the reduction phase—all that is required is that all outputs of the map operation which share the same key are presented to the same reducer, at the same time. While this process can often appear inefficient compared to algorithms that are more sequential, MapReduce can be applied to significantly larger datasets than that which "commodity" servers can handle—a large server farm can use MapReduce to sort a petabyte of data in only a few hours. The parallelism also offers some possibility of recovering from partial failure of servers or storage during the operation: if one mapper or reducer fails, the work can be rescheduled—assuming the input data are still available.

However, in this computing configuration there are number possible attacks, including a rogue worker node that produces bad results, produces no results, produces results slowly, produce extra tasks, replaces good tasks with bad tasks "leaks" tasks or results to allow parties outside a firewall to see them.

It will be apparent to the skilled artisan, then, that security in Cloud computing environments can be complicated. In the presence of potentially malicious nodes in a public cloud, the master node needs to be able to both detect suspicious nodes and take corrective action when a suspicious node is detected

BRIEF SUMMARY OF THE INVENTION

Embodiments of the present invention address deficiencies of the art in respect to distributed computing for large data sets on clusters of computers and provide a novel and non-obvious method, system and computer program product for detecting and correcting malicious nodes in a cloud computing environment (e.g., MapReduce computing). In one embodiment of the invention, a computer-implemented method for detecting and correcting malicious nodes in a cloud computing environment can include selecting a task to dispatch to a first worker node, setting a suspicion index threshold for the selected task, determining a suspicion index for the selected task, comparing the suspicion index to the suspicion index threshold and receiving a result from a first worker node.

In one aspect of the embodiment, setting a suspicion index threshold for the selected task can include identifying an expected processing time for the selected task and identifying a configuration type of the first worker node. In another aspect of the embodiment, the determining a suspicion index for the selected task can include determining prior performance of the first worker node and determining a current workload of the first worker node.

Also, the computer-implemented method further can include applying a recovery action when the suspicion index exceeds the selected suspicion index threshold. The application of the recovery act can include selecting a second worker node for the selected task, discarding results returned by the first worker node and stopping further use of the first work node.

In another embodiment of the invention, a data processing system for detecting and correcting malicious nodes in a cloud computing environment can include a router configured for communicative coupling to one or more requesting clients over a computer communications network. The data processing system also can include a master node manager for distributing selected tasks to at least one worker node. Finally, the data processing system can include a suspicion detector. The suspicion detector can include program code enabled to select a task to dispatch to a first worker node, to set a suspicion index threshold for the selected task, to determine a suspicion index for the selected task, to compare the suspicion index to the suspicion index threshold and to receive a result from a first worker node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to distributed computing for large data sets on clusters of computers and provide a novel and non-obvious method, system and computer program product for detecting and correcting malicious nodes in a cloud computing environment (e.g., MapReduce computing). In accordance with an embodiment of the present invention, a computer-implemented method for detecting and correcting malicious nodes in a cloud computing environment can include selecting a task to dispatch to a first worker node, setting a suspicion index threshold for the selected task, determining a suspicion index for the selected task, comparing the suspicion index to the suspicion index threshold and receiving a result from a first worker node. In an aspect of this embodiment the computer-implemented method further can include applying a recovery action when the suspicion index exceeds the selected suspicion index threshold. The application of the recovery act can include selecting a second worker node for the selected task, discarding results returned by the first worker node and stopping further use of the first work node.

Figure 1:
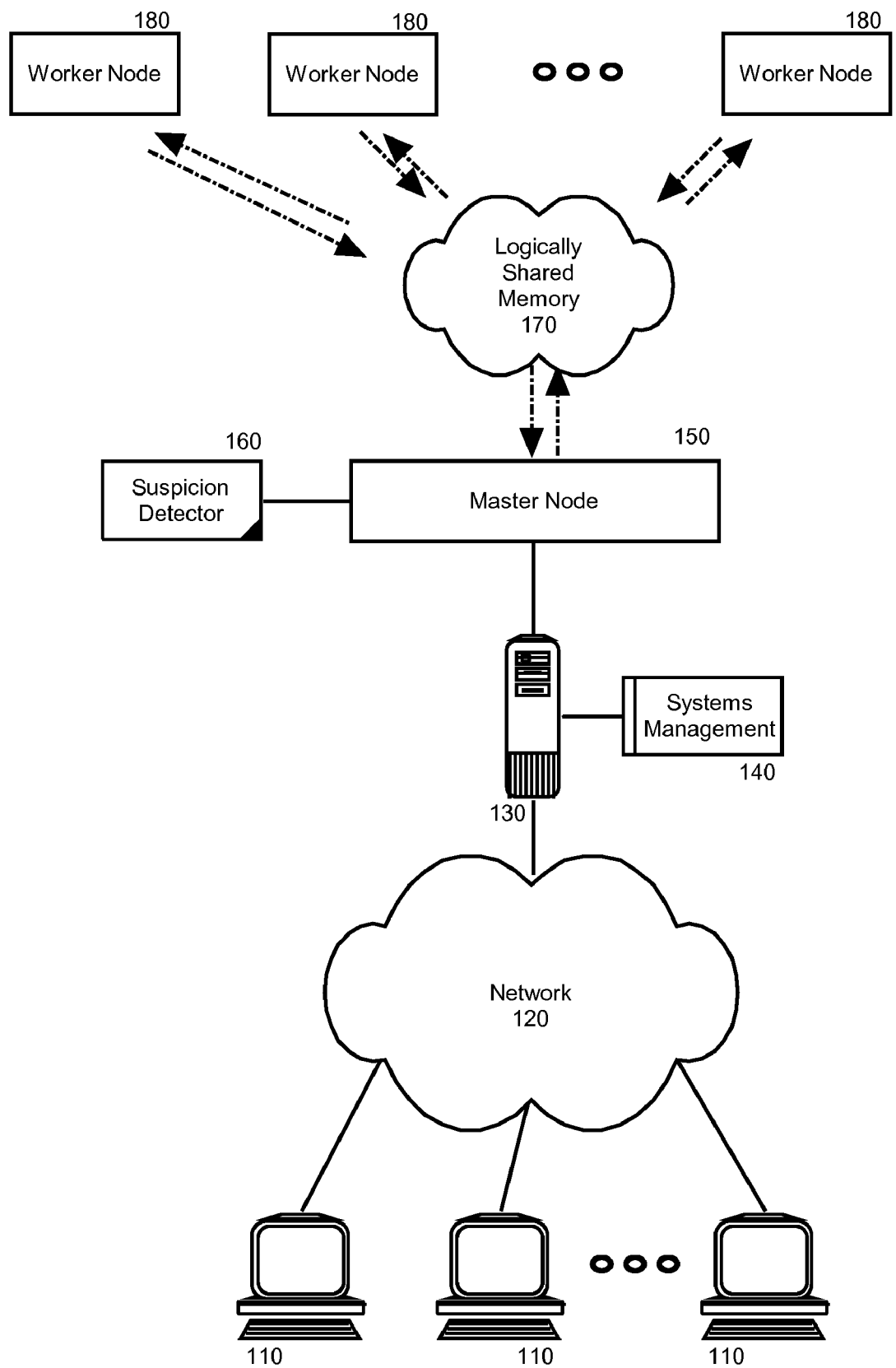
FIG. 1 is a schematic illustration of distributed computing for large data sets on clusters of computers in a cloud computing environment; and, FIG. 2 is a flow chart illustrating a process for detecting and correcting malicious nodes in a cloud computing environment.

In further illustration, FIG. 1 is a schematic illustration of distributed computing for large data sets on clusters of computers in a cloud computing environment. The data processing system for detecting and correcting malicious nodes in a cloud computing environment can include a workload router 130 coupled to one or more client requestors 110 over a computer communications network 120. The workload router 130 can be configured to route requests to one or more master nodes 150. Master node 150 can process the requests into smaller elements, e.g., tasks and distribute those tasks to the one or more worker nodes 180 for processing.

Notably, a suspicion detector 160 can be communicatively coupled both to the router 130 and the master node 150, or it could be part of the master node 150. The suspicion detector 160 can include program code enabled to select a task to dispatch to a first worker node, to set a suspicion index threshold for the selected task, to determine a suspicion index for the selected task, to compare the suspicion index to the suspicion index threshold and to receive a result from a first worker node. The suspicion detector 160 further can include program code enabled to apply a recovery action when the suspicion index exceeds the selected suspicion index threshold. Worker nodes can be used or not used at the discretion of master node 150 using input from the suspicion detector 160.

The master node 150 and the worker nodes 180 can be communicatively coupled to a logically shared memory 170 and share communications. For example, the master node 150 can distribute tasks (e.g., subproblems) to the worker nodes 180 via the shared memory 170, while the worker nodes 180 retrieve the tasks. The worker nodes 180 can then produce the result, while the master node 150 collects the results and reduces the collected results into the answer to the problem the master originally received in a request from a client requestor 110.

Figure 2:
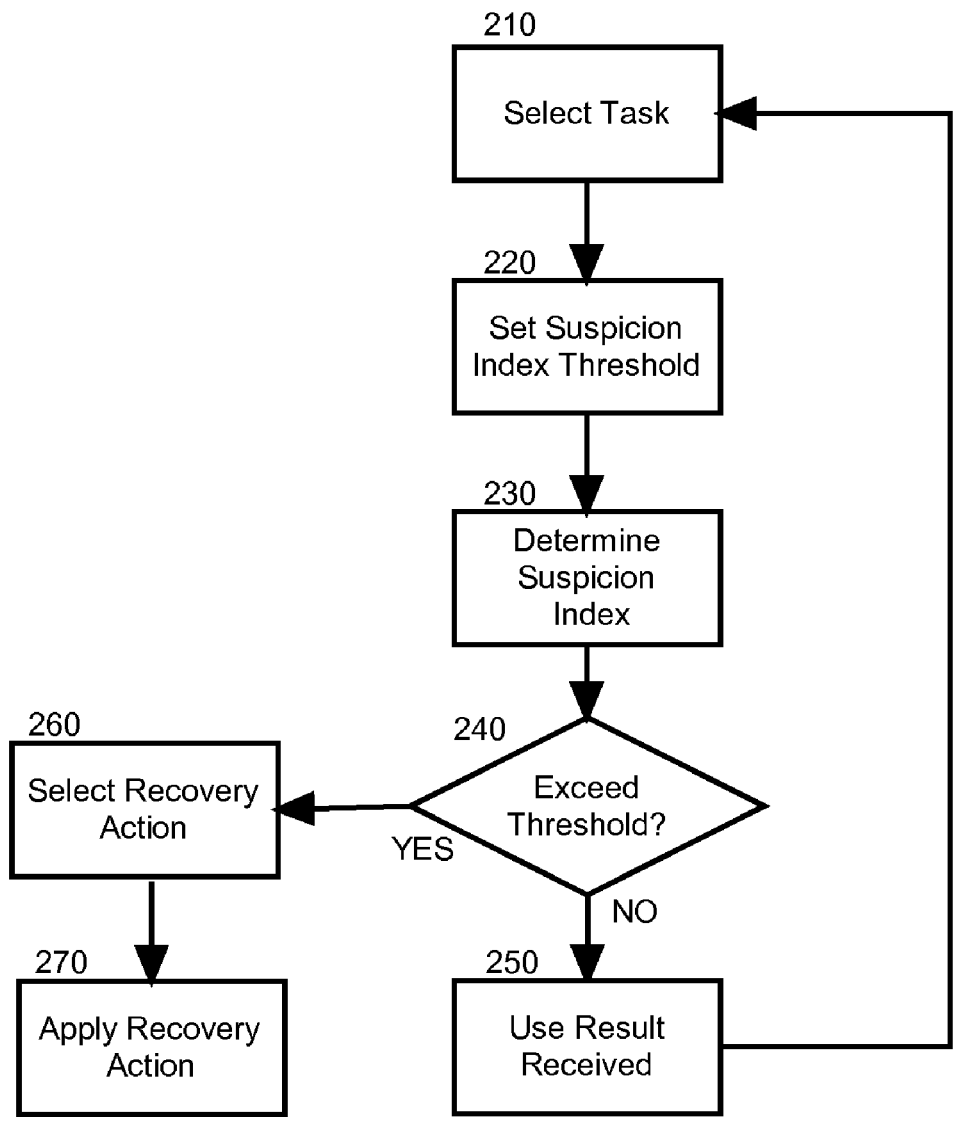

In further illustration, FIG. 2 is a flow chart illustrating a process for detecting and correcting malicious nodes in a cloud computing environment. Beginning in block 210, one or more tasks can be selected for dispatch to a target worker node 180, e.g., first worker node. In block 220, a suspicion index threshold for the selected task can be set, which can be based on an expected processing time for the selected task and a configuration type of the first worker node. For example, the first worker node 180 can be a hardware and/or software configuration. In embodiments the suspicion index threshold will be some value above the minimum value of zero (0), for example, three (3) or five (5). Next, in block 230, an initial value for the suspicion index is determined. The initial value of the suspicion index can be determined based on the master node's prior experience with the first worker node 180. For example, when the first worker node is a "new" node, e.g., a node that the master node has not used before, the suspicion index can be determined to have the minimum value of zero (0). The same can occur when the node has reliably returned correct results in a timely manner. In other embodiments, the initial value of the suspicion index can be determined to have a positive value below the suspicion index threshold but greater than zero (0) when the first worker node has returned reliable results but in an untimely manner. The value of the suspicion index increases over time based on a suspicion detector function determined by the suspicion detector 160. This suspicion detector function can be based on the hardware and/or software configuration and/or current workload of the worker node.

In decision block 240, it can be determined whether or not the determined suspicion index has exceeded the suspicion index threshold. If the determined suspicion index has not exceeded the suspicion index threshold, then in block 250, the result from the first worker node can be used by the master node 150 in its reduce step. Otherwise, in block 260, a recovery action can be selected. Potential recovery actions include submitting the request to a new node, discarding any result from the original node and stopping further use of the original node. Another potential recovery action includes selecting a second worker node for selected task, comparing results returned by the first worker node to results returned by the second worker node and resetting the suspicion index of the first worker node to a minimum value (e.g., zero (0)) conditioned upon a positive match of the results returned by the first worker node to the results returned by the second worker node (assuming a timely response from the second worker node).

Yet another potential recovery action includes selecting a second worker node and a third worker node for the selected task, comparing results returned by the first worker node to results returned by the second worker node and to the results returned by the third worker node and stopping use of the first worker node conditioned upon a negative match of the results returned by the first worker node to the results returned by the second worker node and the results returned by the third worker node. Still yet another potential recovery action includes selecting a second worker node and a third worker node for the selected task, comparing results returned by the first worker node to results returned by the second worker node and to the results returned by the third worker node and lowering the suspicion index of the first worker node conditioned upon a positive match of the results returned by the first worker node to the results returned by the second worker node and the results returned by the third worker node.

Other potential recovery actions can include logging an administrative message and/or sending an event to an event coordinator. In any event, one of the potential recovery actions can be applied in block 270.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for detecting and correcting malicious nodes in a cloud computing environment, the data processing system comprising:
    a router configured for communicative coupling to one or more requesting clients over a computer communications network;
    a master node manager configured for distributing selected tasks to at least one worker node;
    a suspicion detector comprising program code enabled to select a task to dispatch to a first worker node, to set a suspicion index threshold for the selected task, to determine a suspicion index for the selected task, to compare the suspicion index to the suspicion index threshold and to receive a result from a first worker node;
    wherein the suspicion detector further comprises program code enabled to select a recovery action; and
    wherein the suspicion detector further comprises program code enabled to dispatch the selected task to a second worker node, to receive a result from the second worker node, to dispatch the selected task to a third worker node, to receive a result from the third node, to compare the result returned by the first worker node to the result returned by the second worker node and to the result returned by the third worker node and to stop further use of the first worker node when there is a negative match of the result returned by the first worker node to the result returned by the second worker node and to the result returned by the third worker node.

2. The data processing system of claim 1, wherein the suspicion detector further comprises program code enabled to apply a suspicion detector function for calculating the suspicion index over time for the selected task to identify a configuration type of the first worker node; and to determine a current workload of the first worker node.

3. A computer program product comprising a computer usable storage medium storing therein computer usable program code for detecting and correcting malicious nodes in a cloud computing environment, the computer program product comprising:
    computer usable program code for selecting a task using a master node manager and dispatching the selected task to a first worker node;
    computer usable program code for setting a suspicion index threshold for the selected task;
    computer usable program code for determining a suspicion index for the selected task;
    computer usable program code for comparing the suspicion index to the suspicion index threshold;
    computer usable program code for receiving a result from a first worker node;
    computer usable program code for selecting a recovery action; and
    wherein the computer usable program code for selecting a recovery action, includes:
    computer usable program code for dispatching the selected task to a second worker node;
    computer usable program code for receiving a result from the second worker node;
    computer usable program code for comparing the result returned by the first worker node to the result returned by the second worker node; and
    computer usable program code for resetting the suspicion index of the first worker node to a minimum value when there is a positive match of the result returned by the first worker node to the result returned by the second worker node.

4. The computer program product of claim 3, wherein the computer usable program code for setting a suspicion index threshold for the selected task comprises:
    computer usable program code for identifying an expected processing time for the selected task; and,
    computer usable program code for identifying a configuration type of the first worker node.

5. The computer program product of claim 3, wherein the computer usable program code for determining a suspicion index for the selected task comprises:
    computer usable program code for applying a suspicion detector function for calculating the suspicion index over time for the selected task;
    computer usable program code for identifying a configuration type of the first worker node; and, computer usable program code for determining a current workload of the first worker node.

6. The computer program product of claim 3, wherein the computer usable program code for determining an initial value for the suspicion index for the selected task, comprises:
computer usable program code for determining prior performance of the first worker node.

7. A computer program product comprising a computer usable storage medium storing therein computer usable program code for detecting and correcting malicious nodes in a cloud computing environment, the computer program product comprising:
computer usable program code for selecting a task using a master node manager and dispatching the selected task to a first worker node;
computer usable program code for setting a suspicion index threshold for the selected task;
computer usable program code for determining a suspicion index for the selected task;
computer usable program code for comparing the suspicion index to the suspicion index threshold;
computer usable program code for receiving a result from a first worker node;
computer usable program code for selecting a recovery action; and
wherein the computer usable program code for selecting a recovery action, comprises:
computer usable program code for dispatching the selected task to a second worker node;
computer usable program code for receiving a result from the second worker node;
computer usable program code for dispatching the selected task to a third worker node;
computer usable program code for receiving a result from the third worker node;
computer usable program code for comparing the result returned by the first worker node to the result returned by the second worker node and to the result returned by the third worker node; and
computer usable program code for resetting the suspicion index of the first worker node to a minimum value when there is a positive match of the result returned by the first worker node to the result returned by the second worker node and to the result returned by the third worker node.

8. The computer program product of claim 7, wherein the computer usable program code for setting a suspicion index threshold for the selected task comprises:
computer usable program code for identifying an expected processing time for the selected task; and,
computer usable program code for identifying a configuration type of the first worker node.

9. The computer program product of claim 7, wherein the computer usable program code for determining a suspicion index for the selected task comprises:
computer usable program code for applying a suspicion detector function for calculating the suspicion index over time for the selected task;
computer usable program code for identifying a configuration type of the first worker node; and,
computer usable program code for determining a current workload of the first worker node.

10. The computer program product of claim 7, wherein the computer usable program code for determining an initial value for the suspicion index for the selected task, comprises:
computer usable program code for determining prior performance of the first worker node.

11. A computer program product comprising a computer usable storage medium storing therein computer usable program code for detecting and correcting malicious nodes in a cloud computing environment, the computer program product comprising:
computer usable program code for selecting a task using a master node manager and dispatching the selected task to a first worker node;
computer usable program code for setting a suspicion index threshold for the selected task;
computer usable program code for determining a suspicion index for the selected task;
computer usable program code for comparing the suspicion index to the suspicion index threshold;
computer usable program code for receiving a result from a first worker node;
computer usable program code for selecting a recovery action; and
wherein the computer usable program code for selecting a recovery action, comprises:
computer usable program code for dispatching the selected task to a second worker node;
computer usable program code for receiving a result from the second worker node;
computer usable program code for dispatching the selected task to a third worker node;
computer usable program code for receiving a result from the third worker node;
computer usable program code for comparing the result returned by the first worker node to the result returned by the second worker node and to the result returned by the third worker node; and
computer usable program code for stopping further use of the first worker node when there is a negative match of the result returned by the first worker node to the result returned by the second worker node and to the result returned by the third worker node.

12. The computer program product of claim 11, wherein the computer usable program code for setting a suspicion index threshold for the selected task comprises:
computer usable program code for identifying an expected processing time for the selected task; and,
computer usable program code for identifying a configuration type of the first worker node.

13. The computer program product of claim 11, wherein the computer usable program code for determining a suspicion index for the selected task comprises:
computer usable program code for applying a suspicion detector function for calculating the suspicion index over time for the selected task;
computer usable program code for identifying a configuration type of the first worker node; and,
computer usable program code for determining a current workload of the first worker node.

14. The computer program product of claim 11, wherein the computer usable program code for determining an initial value for the suspicion index for the selected task, comprises:
computer usable program code for determining prior performance of the first worker node.

15. A data processing system for detecting and correcting malicious nodes in a cloud computing environment, the data processing system comprising:
a router configured for communicative coupling to one or more requesting clients over a computer communications network;
a master node manager configured for distributing selected tasks to at least one worker node;

a suspicion detector comprising program code enabled to select a task to dispatch to a first worker node, to set a suspicion index threshold for the selected task, to determine a suspicion index for the selected task, to compare the suspicion index to the suspicion index threshold and to receive a result from a first worker node;

wherein the suspicion detector further comprises program code enabled to select a recovery action; and wherein the suspicion detector further comprises program code enabled to dispatch the selected task to a second worker node, to receive a result from the second worker node, to dispatch the selected task to a third worker node, to receive a result from the third worker node, to compare the result returned by the first worker node to the result returned by the second worker node and to the result returned by the third worker node and to reset the suspicion index of the first worker node to a minimum value when there is a positive match of the result returned by the first worker node to the result returned by the second worker node and to the result returned by the third worker node.

16. The data processing system of claim 15, wherein the suspicion detector further comprises program code enabled to apply a suspicion detector function for calculating the suspicion index over time for the selected task to identify a configuration type of the first worker node; and to determine a current workload of the first worker node.

* * * * *